United States Patent [19]
Lawton et al.

[11] Patent Number: 5,193,024
[45] Date of Patent: Mar. 9, 1993

[54] LIQUID/VAPOR OPTICAL MODULATOR

[75] Inventors: John A. Lawton, Landenberg, Pa.; Evan D. Laganis, Wilmington; James L. Hohman, Jr., Newark, both of Del.

[73] Assignee: E. I Du Pont de Nemours and Company, Wilmington, Del.

[21] Appl. No.: 606,364

[22] Filed: Oct. 31, 1990

[51] Int. Cl.$^5$ .......................... G02F 1/03; G02F 26/00
[52] U.S. Cl. ........................................ 359/253; 359/297
[58] Field of Search ............... 350/354, 353; 359/253, 359/297

[56] References Cited

U.S. PATENT DOCUMENTS

| | | | |
|---|---|---|---|
| 3,664,726 | 10/1969 | Mattis | 350/160 |
| 3,951,520 | 4/1976 | Waring, Jr. | 350/160 |
| 4,148,563 | 4/1979 | Herbert | 350/285 |
| 4,260,225 | 4/1981 | Walles | 350/353 |
| 4,536,061 | 8/1985 | Nishimura | 350/354 |
| 4,900,135 | 2/1990 | Yuasa et al. | 350/354 |

FOREIGN PATENT DOCUMENTS

| | | |
|---|---|---|
| 58-219529 | 12/1983 | Japan . |
| 58-219530 | 12/1983 | Japan . |
| 58-219532 | 12/1983 | Japan . |
| 58-219533 | 12/1983 | Japan . |
| 58-220127 | 12/1983 | Japan . |
| 61-209415 | 9/1986 | Japan . |

Primary Examiner—Rolf Hille
Assistant Examiner—Robert Limanek
Attorney, Agent, or Firm—Thomas H. Magee

[57] ABSTRACT

Apparatus and methods for modulating light involving the formation of bubbles in a normally opaque dye solution contained within a cell. The bubbles are created in the dye solution by focusing a beam from a laser in regions of the dye solution thereby vaporizing a solvent in the solution. When the bubble is formed, the modulator becomes substantially transparent in the region of the bubble. If the focused laser beam is turned off, the bubble condenses and the modulator again becomes opaque in the region of the condensed bubble.

17 Claims, 5 Drawing Sheets

LIQUID/VAPOR OPTICAL MODULATOR

FIELD OF THE INVENTION

The invention relates to novel methods and apparatus for the modulation of light, utilizing a dye solution in a modulator cell, a laser, and another light source, wherein the energy generated by a focused laser beam is absorbed by the dye solution, thereby creating a bubble within the solution, and thereby significantly reducing the optical density of that cell in the region of the bubble. This invention more particularly relates to novel methods and apparatus for high contrast ratio modulation of unpolarized light at moderately high switching speeds.

BACKGROUND OF THE INVENTION

Many methods for the modulation of light exist within the art, each method having advantages and disadvantages for each particular use. For example, a mechanical shutter may be used as a very effective means to modulate light, with near infinite contrast ratio, but the switching speed of a mechanical shutter is for the most part limited to slower than a kilohertz unless more exotic piezoelectric shutters, requiring expensive power supplies and fairly elaborate setups, are utilized. A liquid crystal modulator may be utilized for switching speeds in the low kilohertz range, and these modulators generally have good contrast ratio (typically on the order of 20 or 30:1 but some claim 500:1), however liquid crystal modulators, for the most part can only transmit polarized light and they experience photochemical breakdown when used in UV applications. An acousto-optic modulator, when used with a laser, can generally provide excellent contrast ratio (>800:1) and switching speeds in the megahertz range, however its overall transmission efficiency is somewhat low at high modulation speeds, the set-up of the modulator is rather involved, and for UV operation the light must be polarized. Electro-optic modulators, when used with a laser, provide good contrast ratio with very high modulation frequencies but require polarized light, precise set-up, and their reliability is questionable.

Other modulation devices, related to the invention described herein, are; by Walles (U.S. Pat. No. 4,260,225, Apr. 7, 1981) which involves changes in solubility of a polymeric solution in a solvent, due to temperature changes, causing changes in optical density of a cell; by Waring, Jr. (U.S. Pat. No. 3,951,520, Apr. 20, 1976) which involves changes in a dispersion of two immiscible phases, due to changes in temperature, causing changes in the scattering of light through a cell; by Mattis (U.S. Pat. No. 3,664,726, May 23, 1972) which involves the transition of a metallic oxide or salt, contained in a cell, from a translucent to a reflective state, caused by heating with an electromotive force; and by Herbert (U.S. Pat. No. 4,148,563, Apr. 10, 1979) in which the total internal reflectance of a cell is changed by the refractive index change when a liquid/vapor phase change occurs.

More closely related is art by Nishimura (Japanese Application Numbers Sho 57-102305, 57-102295, 57-102296, 57-102291, and 57-102292 all filed on Jun. 16, 1982) in which a bubble is generated, by electrical resistance heating, in an opaque fluid thereby changing the cell from optically opaque to transmissive in the region of the bubble. Another application by Kawamura (Japanese Application No. Sho 60-51010, May 14, 1985) exhibits an optical shutter that works on substantially the same principle as that of the Nishimura devices.

In each of the applications described in the previous paragraph, the heat that produces the bubble is generated by an electrical element. For a transmissive cell, this electrical element must be transparent and must be accessed by a multiplexing circuit that is preferably transparent. In addition these transparent electrical elements and circuits are preferably of good optical quality in order to eliminate scattering and distortion of the transmitted light. It is also required that the electrical elements be placed in discrete locations thereby preventing the generation of bubbles in random locations within the cell. This discrete location of each electrical element requires that the elements be small and tightly packed in order to obtain high resolution of the transmitted or reflected light through the bubbles that make up an image.

Existing optical modulators generally have disagreeable characteristics in imaging applications especially where UV radiation is utilized. For example, suppose a HeCd laser is to be utilized for exposure of a photopolymer in a solid imaging or stereolithography process. The commercial HeCd lasers have a UV output of 325 nm and are fairly low in power, making the three-dimensional object formation relatively slow. To speed up the object formation process, medium power HeCd UV lasers are employed. However, to gain the higher power, manufacturers usually provide lasers with unpolarized and multimode output. In conjunction with the medium power lasers, a method of moderately fast beam modulation should be employed to ensure uniform exposure over the image plane. Unfortunately, for such a system, none of the existing modulation systems work well considering the laser output and the modulation speeds required. The mechanical shutters operate too slowly to provide the proper exposure control and even image edge control. The liquid crystal shutters require polarized light and the liquid crystal medium is not stable under UV radiation. The AO and EO modulators require polarized light for operation at this wavelength and the multimode output of the laser makes the AO modulator inefficient. If one wishes to provide a UV exposure system, a higher power UV laser, such as an Argon Ion laser may be effectively utilized with say an AO modulator, however, this entails significant added expense. On the other hand, one might attempt to utilize an incoherent UV light source masked by silver halide films to project the image. This may provide high resolution within a layer but subsequent layers may not be properly registered with other layers and the films are difficult to handle with sufficient speeds.

SUMMARY OF INVENTION

In accordance with this invention, methods and apparatus are disclosed by which an optical modulator, utilizing dyes and solvents contained within a cell, may be produced for switching on and off light generated from a laser beam or for switching on and off light generated from an incoherent light source. Also disclosed are uses of such an optical modulator in systems that produce images, whether two or three-dimensional.

In general the liquid/vapor modulator utilizes a liquid dye solution contained within a gap in a cell. Under normal conditions, the dye solution makes the cell substantially opaque to certain wavelengths of light. However, when a laser, with a heat-beam output, is focused on the dye solution at a point within the cell, a bubble is formed. The bubble is substantially transparent to the wavelengths of the illumination radiation that were previously blocked by the dye solution, and therefore wavelength portions of the illumination radiation that were previously blocked may transmit through the bubble and the cell as image radiation. If the laser is turned off, or if the laser heat-beam is caused to point in another region of the cell, the bubble condenses, allowing the dye solution to again make that region of the cell, where the bubble condensed, opaque.

Therefore, herein is disclosed a method of modulating image radiation comprising the steps of:
a) containing a dye solution in a cell;
b) illuminating said cell and said dye solution with illumination radiation having a wavelength, said solution being adaptable to substantially block said wavelength of said radiation; and
c) intersecting a region of said dye solution with a heat-beam, thereby forming a bubble within said region of said solution, allowing at least part of said illumination radiation of said wavelength to pass through said bubble and said cell, and turning said image radiation on.

In the preferred case, not only is it desirable to turn the image radiation on, but also off using the above modulation means. Therefore, herein is disclosed a method of modulating image radiation off, comprising the additional steps of:
d) removing said heat-beam from said region of said dye solution; and
e) allowing said bubble in said region of said solution to condense, thereby substantially blocking said illumination radiation of said wavelength and thereby modulating said image radiation off.

DESCRIPTION OF PREFERRED EMBODIMENT

In general, the liquid/vapor modulator works on the principle that the solubility of a dye in a solvent changes dramatically when that solvent goes through a phase change from a liquid to a vapor or from a vapor to a liquid. The optical density, or the amount of light blocked by the dye solution also changes dramatically due to the changes of dye solubility within the solvent phases. For the purposes of this disclosure, the term blocked means that the light energy is prevented from passing through or reflecting through the dye solution in its original form. For example, light of one wavelength may be absorbed by the dye solution and therefore blocked, however, the absorbed light energy may be converted, by photoluminescent means, to another wavelength which may or may not be blocked. Or, for example, the light energy may be converted to heat which may or may not be blocked. The optical density or absorption is defined as $\log_{10}$(Incident light intensity/Transmitted light intensity). Since for many solvents, under the proper conditions, the liquid to vapor or vapor to liquid phase change is easily reversible, the solubility of the dyes within the phase changing solution is generally also reversible, and therefore the optical density of the phase changing solution is reversible. Generally, if a vapor bubble can be formed, within a liquid dye solution of high optical density, the optical density in the region of the bubble will become substantially low or transparent. If the vapor bubble condenses to a liquid, and the dyes become dissolved in the condensed liquid, the region where the bubble existed before becomes optically dense.

Figure 1:
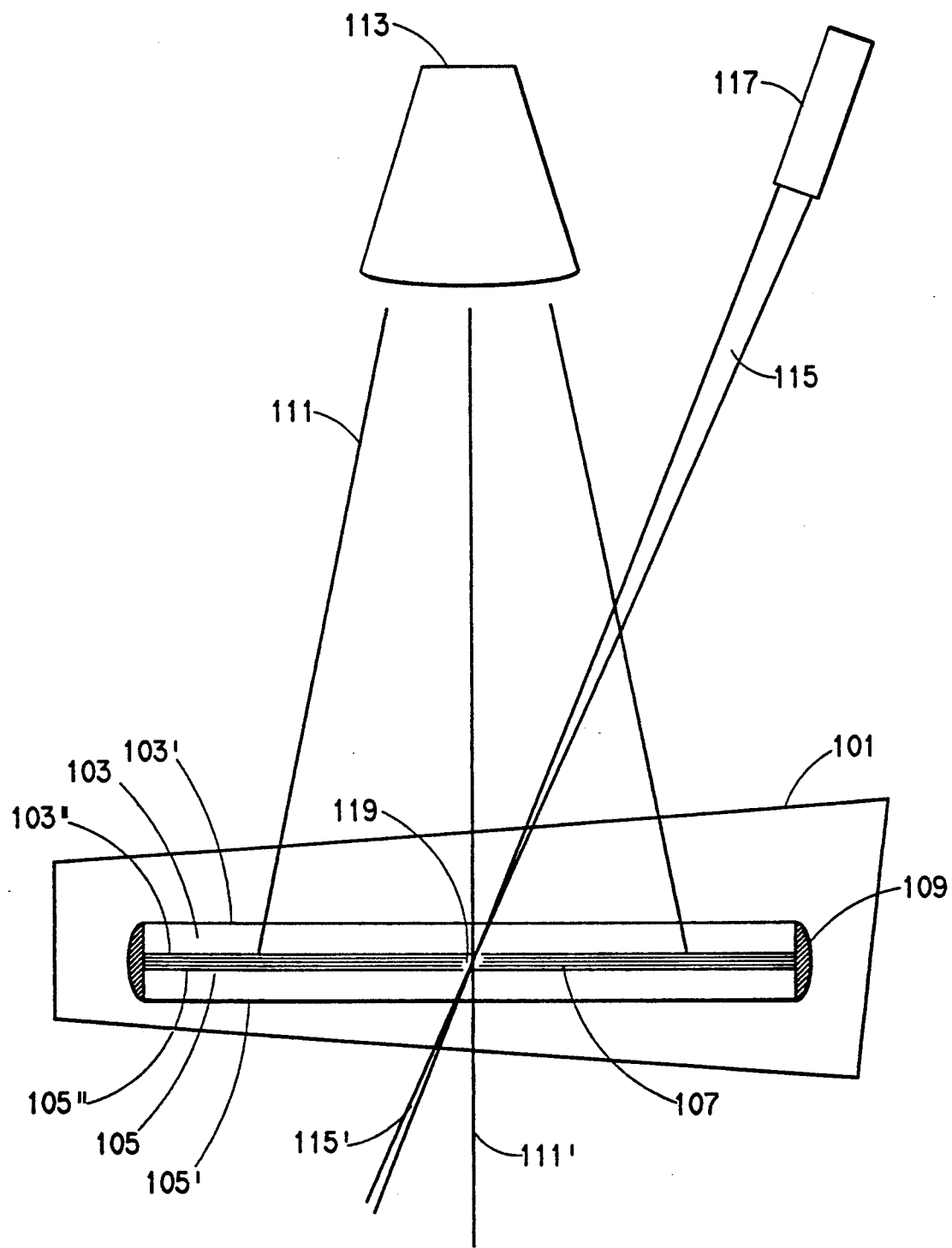
FIG. 1 depicts the basic operation of a liquid/vapor modulator wherein the beam from a heat-beam laser, focused on the dye solution in a cell, creates a bubble in the cell that lets illumination radiation from an incoherent illumination source transmit through the cell.

FIG. 1 develops the description of the liquid/vapor modulator further. The liquid/vapor modulator 101 is constructed with two transparent plates. One plate will be called the illuminated plate 103 and the other plate will be called the image plate 105. The plates each have two main surfaces. In the illuminated plate 103, there is an illuminated-external-surface 103' and an illuminated-internal-surface 103". In the image plate 105, there is an image-external-surface 105' and an image-internal-surface 105". The illuminated-internal-surface 103" faces the image-internal-surface 105" and between these two surfaces is a dye solution 107. The two plates are held separate and the dye solution 107 is sealed between the two plates by a seal 109. For the purposes of this invention, the dye solution 107 is typically a liquid and will be described as such even though it may also be a gel. In the liquid phase the dye solution 107 is such that it has high optical density in certain wavelengths. Therefore when illumination radiation 111, which emanates from an area exposure incoherent light illumination source 113, is transmitted through the illuminated plate 103 into the dye solution 107, certain wavelengths of the radiation 111 are substantially blocked and do not transmit through the dye solution 107 into the image plate 105. However, in a region where the focused-heat-beam 115, emanating from a heat-beam laser 117, intersects the dye solution 107, a vapor bubble 119 is formed thereby reducing the optical density in this region and allowing the radiation 111, illuminating this region, to transmit through the modulator as imaging radiation 111'. In addition the focused-heat-beam 115 can transmit through the modulator 101 and bubble 119 as a transmitted beam 115'. Image radiation throughout this disclosure will be illumination radiation which passes through a bubble in the dye solution and is of a wavelength, or wavelength range, that the liquid dye solution normally would substantially block. The term image is used primarily as a descriptive term of the radiation's typical function. However, image radiation may also have a function such as, for example, activating a photosensor in an electro-optical circuit, providing a television like screen, etc. Likewise the term focused-heat-beam is used just as a term to describe the function of the beam. The focused-heat-beam is actually coherent light, of any useful wavelength, that is used in the liquid/vapor modulator to generate heat at a point in the dye solution thereby creating a bubble. The focused-heat-beam or heat-beam is often described as intersecting the dye solution. This means that the heat-beam is pointing to a region of the dye solution and is turned on. On the other hand, if the heat-beam is "removed" from a region of the dye solution, it may be pointed to a different region of the dye solution yet turned on, or the heat-beam-laser may be turned off, or the heat-beam may be blocked in some manner, or a combination of these alternatives.

The liquid/vapor modulator may either be used in transmission, as is shown in the Figures, or in reflection. For example, in FIG. 1, the image plate 105 could actually have a mirrored image-internal-surface 105″. The illumination radiation 111 could enter the modulator 101 at an angle and reflect off the image-internal-surface 105″ in the region of a bubble 119 as image radiation 111′ at a complimentary angle. Therefore terms such as image radiation passes "through" the cell or "from" the cell should generally be interpreted to mean either transmission or reflection of image radiation modulated by means of the cell.

The dye solution 107 used in operation of the liquid/vapor modulator 101 is comprised of a solvent and at least one dye which blocks the radiation 111 from the illumination source 113 and the focused-heat-beam 115 from the laser 117. In many cases it is preferred that two or more dyes be in the solution 107. The dye essentially performs two functions. The dye absorbs the radiation from the focused-heat-beam 115 and is efficient at converting the energy of the focused-heat-beam 115 to heat, which then locally heats the solvent in the solution 107 and creates the bubble 119. This dye will hereupon be called the thermal dye. If this dye, or another dye or dyes in the solution 107, blocks at least a portion of the wavelengths of the illumination radiation 111, it will hereupon be called an blocking dye. The blocking dye is preferably not an efficient converter of the illumination radiation 111 to heat. Typically dyes that are not efficient heat converters have high quantum photoluminescent yields and somewhat of a low Stokes shift. It is not desirable that a non-reversible photochemical change occur when any of the dyes in the solution 107 block the illumination radiation 111 or focused-heat-beam 115. With high photoluminescent quantum yield dyes, the energy absorbed from illumination radiation 111 is converted to photoluminesence rather than heat. Typically this photoluminesence occurs at a wavelength that is longer than the absorbed wavelength and is radiated in all directions thereby dispersing the energy. If the illumination radiation 111, for example, is first absorbed by the dye solution 107 adjacent the illuminated-internal-surface 103″ of plate 103, much of the illumination radiation 111, will be converted to photoluminescence by the dye and will be radiated, with a shifted wavelength, in all directions. Much of this photoluminescence will be transmitted back out of the modulator 101 through illumination plate 103. Most of the remainder of this photoluminescence will be absorbed by the surrounding dye solution 107 and converted again to photoluminescence, at typically a longer wavelength and in all directions, with much of the photoluminescence energy escaping back out the modulator 101 through plate 103 and most of the remainder of the photoluminescence energy being absorbed by the surrounding dye solution 107. This would continue until eventually some of the photoluminescent energy reaches the image-internal-surface 105″ of plate 105 where it radiates in all directions. By the time the illumination radiation 111 passes through the dye solution 107, it is substantially reduced in energy, highly dispersed, and typically of a longer wavelength. In this way, the dye utilizes two photoluminescent mechanisms of dissipating the energy of the illumination radiation 111. One mechanism is dissipation of energy by dispersion in all directions, much of which passes through the illumination plate 103. And the other mechanism is conversion of the illumination radiation 111 energy to another wavelength, which in turn is dissipated in all directions.

The wavelength shift that occurs with photoluminescence is called the Stokes Loss or shift. For the most part, there is an energy loss that occurs as a result of the wavelength shift. This energy loss is usually molecular vibrational energy, often called phonon energy, and can cause undesirable heat within the dye solution. It is preferred, in the practice of the general invention that the Stokes shift be fairly small to reduce the heat generated. However, it is more preferred to have a small Stokes shift in which the photoluminescence of the dye solution 107 occurs at a wavelength that is not absorbed by the dye and therefore is free to pass through the modulator. In the more preferred case, the wavelength shift should be such that what ever is being imaged through the modulator is substantially unaffected by the shifted wavelength photoluminescent radiation.

An example will clarify the above teaching relative to the dye solution 107 and the modulator 101. For example, the following experiment was carried out. Illumination source 113 was a mercury arc lamp with a illumination radiation 111 which has a wavelength energy peak at around 365 nm. Other wavelengths are given off, but it is primarily the 365 nm wavelength that causes Cromalin® C4/CP (DuPont, Wilmington, Del.) to photoform. The modulator 101 in this case was constructed from two 6″ by 6″ by 1/16″ thick quartz glass plates, an illumination plate 103 and an imaging plate 105. These two plates were sealed together using a glass sealing flux 109 such that a gap of approximately 1.5 mil existed between the illumination internal surface 103″ and the image-internal-surface 105″. A dye solution 107 was mixed as follows:

POPOP (p-Bis{2-{5-Phenyloxazolyl}}benzene) was added to near saturation in methylene chloride and mixed using an ultrasound for about a minute. Next, SQS IR dye was added to the solution. Precursor and synthesis patents that describe how to formulate SQS may be found in Kawamura (U.S. Pat. No. 4,283,475) and Gravesteijn (U.S. Pat. No. 4,508,811). Finally, Cyasorb-24® (Cyanamid, Wayne, N.J.) UV dye (2,2′-Dihydroxy-4-methoxybenzophenone) was added to the solution 107 which was then injected into the gap made by the modulator 101 plates. The SQS and Cyasorb-24® had been added to the dye solution 107 until the modulator achieved an optical density of over 3.2 from approximately 250 nm to 390 nm. Between approximately 400 nm and 670 nm, the optical density of the modulator 101 was less than 0.7. From approximately 700 nm to 830 nm the optical density of the modulator 101 was over 3.5. The optical density was tested by first placing the modulator 101 without the dye solution 107 in a Varian DM-S 100S UV Visible Spectrophotometer and running a baseline. Next the modulator 101 with the dye solution 107 was placed in the spectrophotometer to obtain the optical density over the wavelengths from 190 nm to 900 nm.

POPOP (in methanol) has a high molar extinction coefficient of approximately 48,000 at 365 nm and a peak photoluminescence emission at around 418 nm. The Stokes Loss or Shift is approximately 2600 cm$^{-1}$ and the photoluminescence quantum yield is approximately 0.93. The Cyasorb ® is added mainly to increase the optical density and to photochemically stabilize the modulator 101 in the UV region. The modulator 101 with the dye solution 107 had a greenish brown tint which was imparted primarily by the IR dye.

The laser 117 used to generate the focused-heat-beam 115 was a Liconix Diolite 30 mW (Liconix, Santa Clara, Calif.) diode laser with wavelength centered around 780 nm. The spot size at the focus of the beam 115 was approximately 127 um but may have been more or less due to adjustments during the experiment.

The Cromalin ® was first laminated, using a Cromalin ® Laminator (DuPont, Wilmington, Del.) set up for positive Cromalin ® lamination, to a Masterproof ® (DuPont, Wilmington, Del.) proof stock. The Mylar ® cover sheet was left on during imaging to prevent oxygen inhibition of the photoformation of the Cromalin ® monomers. Cromalin ® will photoform when exposed to wavelengths around 365 nm but is not very sensitive to wavelengths above 390 nm.

Essentially, the modulator 101 with the dye solution 107 blocked the illumination radiation 111 with a UV peak of 365 nm. The POPOP and Cyasorb-24 ® dyes absorbed this UV radiation and created a photoluminescence with a wavelength centered around 418 nm. This photoluminescence was only partially blocked by the modulator, and some of it was allowed to transmit through the image plate 105 and shine on the Cromalin ®. This photoluminescence wavelength also has little effect on the photoformation of Cromalin ® C4/CP. After about 999 seconds of exposure, the Cromalin ® masked by the modulator 101 showed some sign of photoformation. Normal exposures to photoform Cromalin ® using this light source 113 are for 10 seconds, and an exposure of one second will create photoforming greater than that achieved when exposing through the modulator 101 for 999 seconds. In addition, the illumination radiation 111 had wavelengths all through the visible. If the modulator 101 had blocked all this energy in the visible, it might tend to heat up. However, since the modulator 101 is somewhat transparent in wavelength ranges from 400 nm to 670 nm, much of this visible light energy is transmitted through the modulator 101 without causing detrimental thermal increases within the dye solution 107.

Next, the laser 117 was focused on the dye solution 107 in the modulator 101. In the region where the focused-heat-beam 115 intersected the dye solution 107, a vapor bubble 119 formed and imaging radiation 111' passed through the modulator and photoformed the Cromalin ®. The focused-heat-beam 111 was slowly translated to different regions of the modulator 101, thereby creating photoformed lines on the Cromalin ®. Later the Mylar ® cover sheet was removed from the Cromalin ® and a magenta toner was distributed over the Cromalin ® surface showing the outline of the modulator 101 and the points and lines drawn through the liquid/vapor modulator 101 with the focused-heat-beam 115 and the imaging radiation 111'. A separate test demonstrated that the focused-heat-beam 115 radiation wavelength did not photoform the Cromalin ®.

The solubility of the dyes in the solution 107 is an important consideration. Generally the dyes, if they can be brought to a stable solubility in the solvent at or near room temperature, will be easily diffused back into the warmer condensed vapor where the bubble 119 previously existed and this region will regain its previous optical density.

The dyes should be chosen so that there is little to no non-reversible photochemical change when exposed to the various radiations in use. Use of absorbing protective dyes, such as for example, the Cyasorb-24 ® UV dye in the above example, may be added as an absorbing light stabilizer within the solution 107 to help reduce possible photochemical degradation of the SQS IR dye, thereby extending the life and stabilizing the sensitivity of the dye solution 107 in the modulator 101.

Another dye consideration is that of its inherent heat capacity. Typically, dyes that are in solution, will not have a major impact on the heat capacity of the dye solution 107. However, dyes that are in a dispersion, such as for example India Ink (which might be suitable as a modulator 101 dye solution 107 for a wide range of illumination radiation 111 and focused-heat-beam 115 wavelengths, and which is a dispersion of finely divided carbon in a series of solvents), may have a significant heat capacity. This higher heat capacity usually requires markedly more focused-heat-beam 115 irradiance (Watts/cm$^2$) in order to create a vapor bubble 119 in the dye solution 107, and the heat absorbed by the particles in the dispersion may slow down condensation of the vapor bubble 119 once the focused-heat-beam 115 no longer irradiates the region.

The solvent within the dye solution 107 affects the wavelength blocking capability of the modulator 101 since dye photoluminescent absorption and emission of radiation is typically shifted when various solvents are used. For example, the dye BPSB (Bis( isopropylstyryl)benzene), which is another suitable dye for use in a liquid/vapor modulator 101 as a UV blocking dye having a 0.94 quantum yield and a molar extinction coefficient of over 36000 at 365 nm, has a peak absorption at approximately 357 nm and a peak emission at 415 nm when in a cyclohexane solvent, but has a peak absorption at 362 nm and a peak emission at 420 nm when in a benzene solvent. This wavelength absorption and emission also is affected by other dyes in the dye solution 107 and even the illumination radiation 111 wavelength. For each dye solution 107, the modulator 101 should be tested in a spectrophotometer to determine its true blocking characteristics. The photoluminescence characteristics of the modulator 101 can be studied in a spectrophotometer set up for photoluminescence evaluations.

Many dyes, having high molar extinction coefficient, high photoluminescent quantum yield and adequate Stokes shift, exist that are compatible with various solvent systems. Even phosphors may prove useful in this regard. Following is a partial listing of suitable dye and solvent combinations with the absorption and emission wavelengths and the extinction coefficients:

| Light Rad. (nm) | Dye | Solvent | Extinct. Coeff. at L.R. | Peak Abs. | (nm) Emm. |
| --- | --- | --- | --- | --- | --- |
| 365 | Acridine | Ethanol | 6000 | 356 | 417 |
| 365 | BBO (2,5-Dibi phenylyl-oxazole) | Benzene | 33000 | 340 | 408 |
| 313 | BBO | Benzene | 54000 | 317 | 379 |
| 365 | POPOP | Cyclo-hexane | 39000 | 357 | 415 |
| 365 | POPOP | Benzene | 45000 | 361 | 417 |
| 365 | Dimethyl POPOP (1,4-Bis-2-{4-methyl-5-phenyloxazolyl} benzene | Cyclo-hexane | 49000 | 364 | 419 |
| 436 | Perylene | Benzene | 39000 | 439 | 477 |
| 365 | Diphenyl Stilbene | Benzene | 35000 | 341 | 408 |
| 365 | 1,6-Diphenyl-hexatriene | Cyclo-hexane | 48000 | 354 | 455 |
| 365 | BBOT (2,5-Bis{5-tert-butylbenzoxa-zolyl{2}}thiophene) | Cyclo-hexane | 56000 | 372 | 427 |
| 365 | BBOT | Ethanol | 50000 | 373 | 435 |
| 365 | BBOT | Benzene | 47000 | 377 | 435 |
| 313 | PPO (2,5-Diphenyl-oxazole) | Cyclo-hexane | 24000 | 303 | 357 |
| 313 | PPO | Ethanol | 19000 | 303 | 362 |

Although the preponderance of the dyes above would be suitable for operation in a liquid/vapor modulator 101 designed for switching UV image radiation 111', the use of dyes, such as for example perylene, would allow visible image radiation 111' switching. Also the above dyes are primarily aromatic, other useful dyes would be the various Coumarin, Stilbene, Fluorescein, and Rhodamine dyes, for example.

Examples of thermal dyes which may be useful in the liquid/vapor modulator are as follows:

For example, one of the Squarylium dyes SQS, which typically have the useful property of being low absorbing in the visible while possessing very high extinction coefficient in the near IR, has been used very successfully in a liquid/vapor modulator and is preferred.

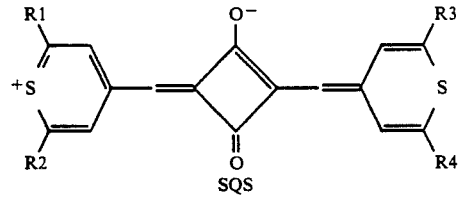
SQS

Wherein each R1, R2, R3, and R4 is independently an alkyl group of from one to eight carbon atoms. In a more preferred embodiment of this invention, the dye is SQS where, R1, R2, R3, and R4 are each t-butyl. SQS is readily soluble in the usual non-reactive organic solvents, such as, for example, alcohols, ketones, acetonitrile, chlorinated hydrocarbons, such dichloromethane, and hydrocarbons, such as toluene. The absorption maximum, 814 nm (measured in dichloromethane) coincides with the wavelength of emission of readily available infra-red diode lasers (750–870 nm).

Or, for example, the Croconium dyes may prove useful in a liquid/vapor modulator.

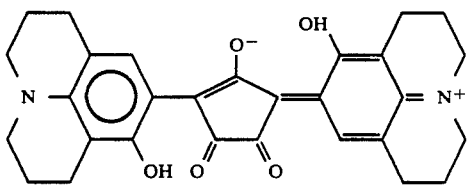

Or, one of the Azo dyes, for example AZ4 and AZ9, have good solubility in methylene chloride, a peak absorption of 750 nm (AZ4) and 778 nm (AZ9), and extinction coefficients of approximately 83,000.

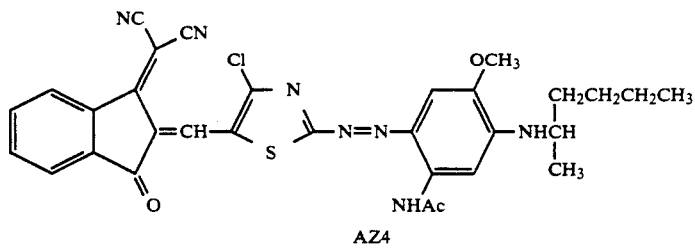
AZ4

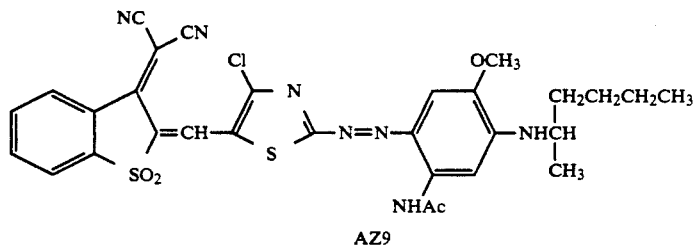
AZ9

On the other hand, some of the Azamethine dyes may prove useful, for example:

AM4 has good solubility in methylene chloride, an absorption peak of 770 nm and an extinction coefficient of 31,200.

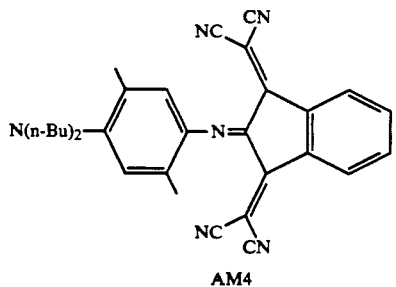

AM4

AM7 also has good solubility in methylene chloride, with an absorption peak of 794 nm, and an extinction coefficient of 39,800.

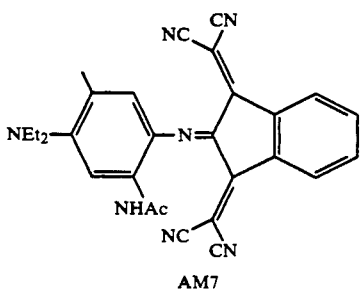

AM7

Or, for example, the Cyanines (Kodak, Rochester, N.Y.) may be used. For example, 3,3'-Diethylthiadicarbocyanine Iodide (DTDC) with a peak absorption at 653 nm and solubility in ethanol, may prove a useful thermal dye in a liquid/vapor modulator switched by a HeNe laser having an output of 633 nm. Or, for example, 1,1',3,3,3',3'-Hexamethyl-4,4',5,5'-dibenzo- 2,2'-indotricarbocyanine Perchlorate having a peak absorption of 782 nm and solubility in acidic ethanol may prove useful as a thermal dye when switched with a diode laser operating at around 780 nm.

Or, for example, the Pyriliums dyes may be useful with diode lasers or YAG lasers operating around 1060 nm. Such dyes and their structures appear in Evans et. al. U.S. Pat. Nos. 4,948,776 and 4,948,777. For example, Kodak Dye 26 (Kodak, Rochester, N.Y.) has a peak absorption at 1080 nm and is soluble in 1,2-dichloroethane.

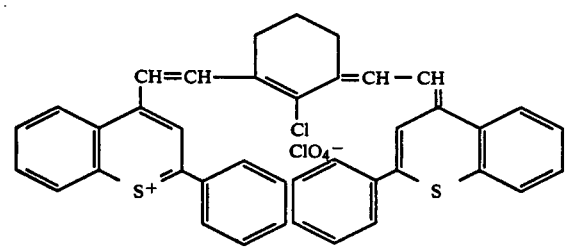

Or, for example the Phthalocyanine dyes with their various metal substitutions, typically soluble in pyridine and 1-chloronaphthalene.

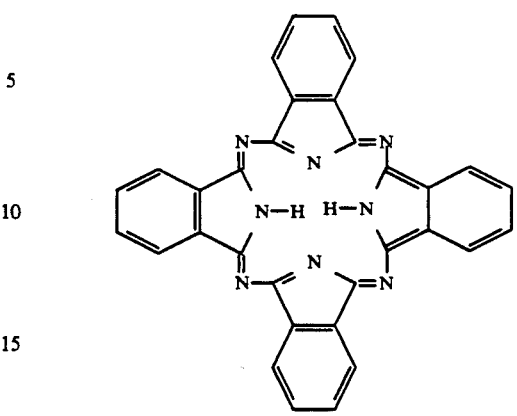

Or, for example, the Cyanine and Merocyanine dyes disclosed in the Evans and DeBoer U.S. Pat. Nos. 4,950,639 and 4,950,640, which are used in thermal dye transfer processes, may prove useful in the liquid/vapor modulator.

Or, as further examples, the Oxyindolizine dyes in the DeBoer U.S. Pat. No. 4,948,778 and in the Chapman and DeBoer patent U.S. Pat. No. 4,952,552, used for thermal dye processes, may be good dyes for modulator use.

For the liquid/vapor modulator 101, the vapor bubble 119 formation/condensation speed, and the energy needed within the focused-heat-beam 115 spot, is highly dependent on the solvent liquid/vapor phase transformation characteristics. When the focal spot from the focused-heat-beam 115 intersects with the dye solution 107, a thermal dye absorbs the radiation and converts the light energy to heat. Based upon the thermodynamic temperature-pressure relationships relative to the dye solution 107, the solvent will exist as either a vapor or a liquid. It is important to understand, from a simplistic point of view, that initially when the dye solution 107 is being heated by the focused-heat-beam 115, a theoretical cylindrical volume (defined by approximately the 1/e 2 diameter of the focal spot and the gap distance between the illumination internal surface 103" and the image-internal-surface 105" of the modulator 101 plates) of dye solution 107 is heated to a temperature that brings that volume up to its saturated liquid temperature at the nominal pressure within the cell. Up till this point, assuming no thermal losses from the volume, the heating of the dye solution 107 to a saturated liquid is primarily a function of the heat capacity of the dye solution 107, the absorption and efficiency of conversion of the focused-heat-beam 115 from light to heat by the dye, and the total energy in the focused-heat-beam 115. To form the bubble 119 from this cylindrical volume of saturated liquid, however, requires only that an equivalent volume of vapor be produced. That is, it is not necessary, and is certainly not even desirable to heat the entire cylindrical volume of dye solution 107 to a vapor. The calculation of the energy necessary to convert that volume of vapor from a saturated liquid is primarily a function of the heat of vaporization of the dye solution 107. For example, it has been calculated that to produce a 0.41 mil diameter by 0.5 mil high cylindrical volume of methylene chloride vapor, using a 2 mW laser 117, assuming no losses and thermodynamic oddities due to presence of the dye, would take approximately 18.5 usec.

The above estimate of bubble forming speed is simplistic since actually the focused-heat-beam 115 from the laser 117 is typically, though not necessarily, of a gaussian profile. This means that the irradiance of the focal spot is highest in the center of the spot and drops off in a gaussian manner away from the spot center. Since the highest irradiance from the focused-heat-beam 115 is in the center of the focal spot, the greatest amount of heat will be generated at this center. Therefore, the center, or axis of the above theoretical cylinder will heat first and will convert to a vapor bubble 119 first, pushing the surrounding dye solution 107 radially outside the bounds of the cylinder. Once the dye solution 107 reaches a certain distance away from the center of the focal spot of the focused-heat-beam 115, it will no longer be absorbing as much energy and therefore will no longer be substantially heated. Since the vapor does not have soluble dye, it is transparent to the focused-heat-beam 115 energy and will not tend to expand further. In essence, the bubble 119 theoretically will grow to an equilibrium cylindrical volume in which, if it begins to collapse, the dye solution 107 will absorb more energy from the focused-heat-beam 115, creating more vapor and countering the collapse. And if the bubble 119 grows too large, less energy will be absorbed from the focused-heat-beam 115, allowing more condensation of the vapor and therefore collapse of the bubble 119.

The focused-heat-beam 115 provides a driving energy to form the bubble 119. However, condensation of the bubble 119 back to a liquid is less forceful in a liquid/vapor modulator 101. The condensation phase change is dependent on dissipation of the heat of vaporization back into the surrounding dye solution 107 and into the illuminated plate 103 and image plate 105. This heat dissipation is slowed by the fact that thermal transfers in a vapor are slow and the fact that the plate materials used in a liquid/vapor modulator 101 are typically good insulators.

A first solution to the slower condensation of the vapor is the substitution of a higher boiling point solvent used within the cell or modulator. For example, use of methanol with a boiling point of 65° C. rather than methylene chloride with a boiling point of 40° C., provides faster bubble condensation, since the heat transfer rates at the higher temperatures, relative to the surrounding dye solution 107 and the cell 101, are faster.

Figure 2:
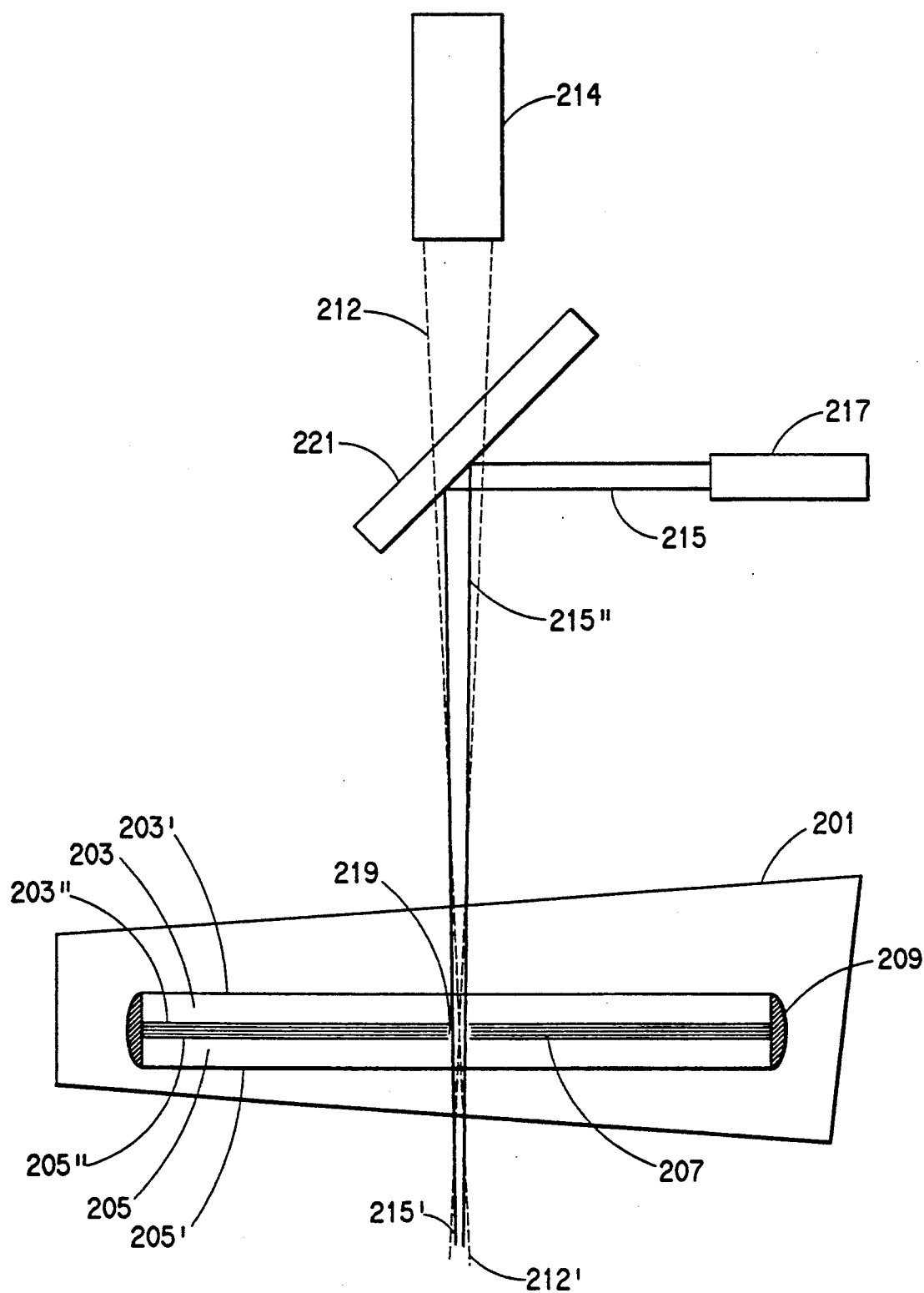
FIG. 2 shows another use of the liquid/vapor modulator wherein the illumination radiation from a illumination laser and the focused-heat-beam from another laser are made substantially collinear. When a bubble is formed in the modulator, the illumination radiation is substantially focused through the bubble, thereby transmitting image radiation.

FIG. 2 shows a liquid/vapor modulator in which the illumination source 113 shown in FIG. 1 is replaced by an illumination laser 214. In addition, the heat-beam laser 217 with focused-heat-beam 215 is reflected off a dichroic mirror 221 such that the reflected-focused-heat-beam 215" is made substantially collinear with focused-illumination-beam 212 emanating from illumination laser 214. The dichroic mirror 221 is such that it transmits the focused-illumination-beam 212 substantially without reflection or change in direction. When passing through the liquid/vapor modulator 201, focused-illumination-beam 212 is focused to a smaller spot than that of reflected-focused-heat-beam 215". When the dye solution 207 is present, the focused-illumination-beam 212 is blocked. At the intersection between the dye solution 207 and the two beams, the focused-illumination-beam 212 passes roughly through the center of reflected-focused-heat-beam 215". A vapor bubble 219 is formed in the dye solution 207 whenever reflected-focused-heat-beam 215" is switched on. When the bubble 219 exists focused-illumination-beam 212 transmits through the modulator 201 as an image beam 212' and reflected-focused-heat-beam 215" transmits as transmitted-heat-beam 215'. The liquid/vapor modulator 201 is constructed with two transparent plates. One plate will be called the illuminated plate 203 and the other plate will be called the image plate 205. The plates each have two main surfaces. In the illuminated plate 203, there is an illuminated-external-surface 203' and an illuminated-internal-surface 203". In the image plate 205, there is an image-external-surface 205' and an image-internal-surface 205". The illuminated-internal-surface 203" faces the image-internal-surface 205" and between these two surfaces is a dye solution 207. The two plates are held separated and the dye solution 207 is sealed between the two plates by a seal 209.

A series of tests utilizing the modulator 201, heat-beam laser 217, dichroic mirror 221, and illumination laser 214 set-up as shown in FIG. 2 were conducted. In the case of the tests, the modulator 201 consisted of two 1/16'th inch thick microscope slide sized plates, spaced approximately 1 mil apart and sealed using a glass flux to form a cell. Small glass tubes were attached to the cell to allow for filling of the dye solution 207. Once the dye solution 207 was in the cell, the cell was placed in dry ice and the tubes were heated and pinched off, providing a sealed modulator 201. The dye solution 207 in one case comprised SQS dye and saturated PPO dye in methylene chloride. The illumination laser 214 was a Liconix (Sunnydale, Calif.) Model 4240B HeCd laser capable of 6 mW output at 325 nm wavelength. The heat-beam laser 217 was a Liconix Diolite with output of 30 mW at around 780 nm. The dichroic mirror 221 was a SWP(45°) 325T/780R mirror (CVI Laser Corporation, Albuquerque, N. Mex.). The modulator 201 with the methylene chloride dye solution 207 was capable of modulating the image beam 212', using the focused-reflected-heat-beam 215", up to only 13 hz. When the same set-up was tested replacing the methylene chloride with methanol in the dye solution 207, the modulation speed was measured to approximately 2000 hz using a photodiode and oscilloscope. 2000 hz is probably not a limit for the methanol dye solution 207 modulator 201 since alignment, and focusing of the beams using bench hardware was a limitation.

Many kinds of solvents and solvent mixtures, additives such as polymers, oils, water, etc., boiling/condensation crystals, surfactants, and so on may be used to modify the the phase changes from liquid to vapor and vapor to liquid in the liquid/vapor modulator.

Dissolved air within the dye solution may contribute to the presence of bubbles that do not condense. Also, the presence of oxygen within the dye solution may reduce the photoluminescent quantum yield of the dyes. It is preferred to first fill the cell with the dye solution, then freeze the cell and dye solution in, for example, liquid $CF_4$ (Freon ® 14 boiling point −128° C.), and then draw a vacuum on the cell to remove the unfrozen gases. After several cycles of freeze-vacuuming and thawing of the dye solution, a significant amount of the gases are removed. Finally, the cell dye solution feed tube is pinched off during one of the freeze cycles. Quartz glass is an good material for modulator cell production because it can be sealed using a glass flux, it can generally withstand the temperature extremes of freezing in one region while flame pinching off a tube in a nearby region, and it is substantially inert and impermeable to the dye solution.

Figure 3:
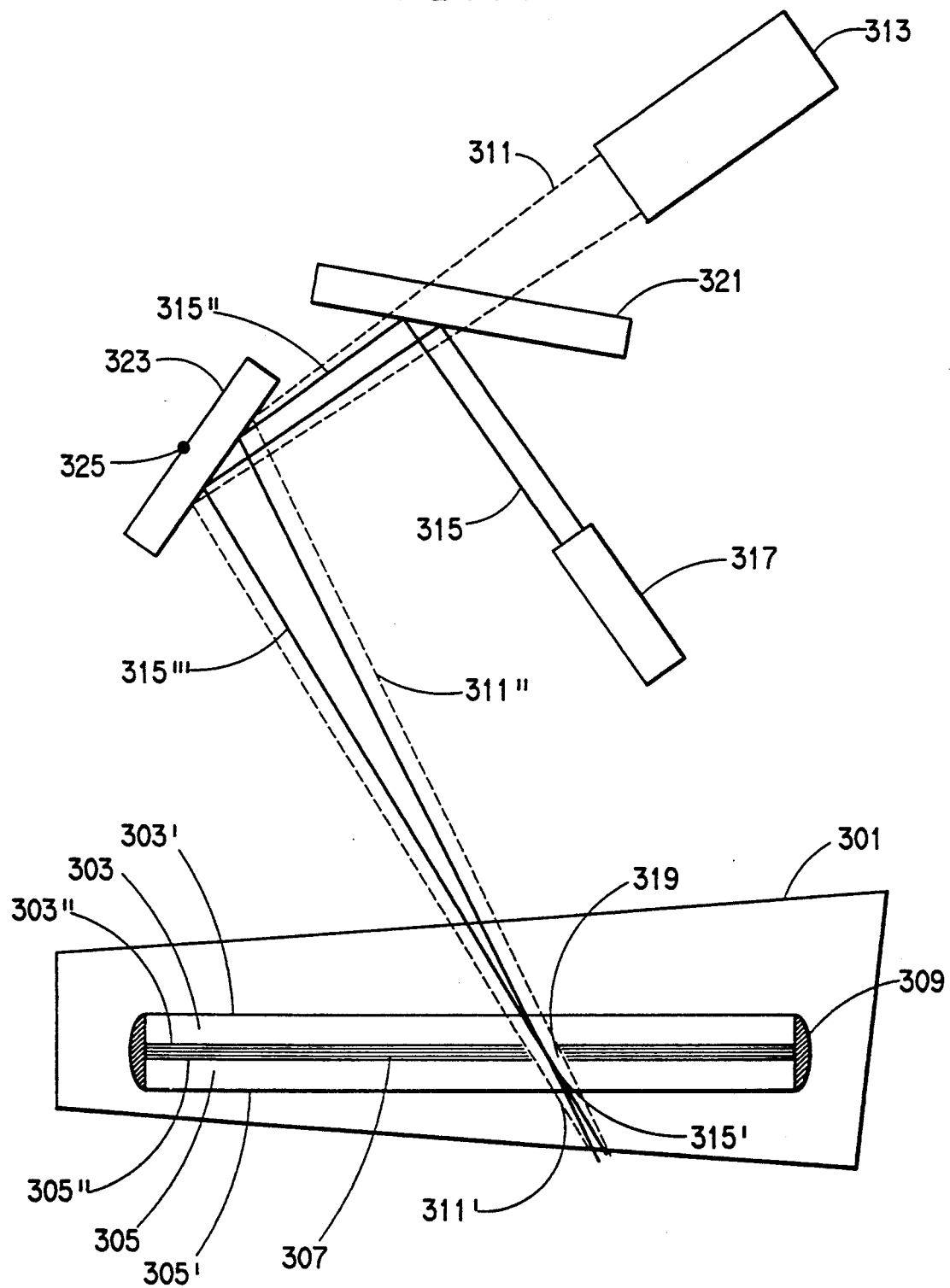
FIG. 3 depicts a use of the liquid/vapor modulator wherein the substantially collinear illumination radiation and the focused-heat-beam are directed to scan different regions of the dye solution, contained within a liquid/vapor modulator cell, utilizing a scan mirror.

FIG. 3 shows a liquid/vapor modulator in which the illumination source 313 is either an illumination laser or a substantially focused incoherent light source. The laser 317 with focused-heat-beam 315 is reflected off a dichroic mirror 321 such that the reflected-focused-heat-beam 315″ is substantially collinear with focused-illumination-beam 311 emanating from illumination source 313. The dichroic mirror 321 is such that it transmits the focused-illumination-beam 311 without substantial reflection or change in direction. Both the reflected-focused-heat-beam 315″ and the focused-illumination-beam 311 are reflected off a mirror (or set of mirrors, not shown for simplicity) 323, which rotates about an axis (or set of axes) 325, and which scans the beams over the surface of the modulator 301. As focused-illumination-beam 311 reflects off mirror 323 it becomes a scanned-illumination-beam 311″ and as reflected-focused-heat-beam 315″ reflects off mirror 323 it becomes a scanned-focused-heat-beam 315‴. When intersecting the liquid/vapor modulator 301, scanned-illumination-beam 311″ is, in this example, focused to a larger spot that that of scanned-focused-heat-beam 315‴. At the intersection between the dye solution 307 and the two beams, the scanned-focused-heat-beam 315‴ passes roughly through the center of scanned-illumination-beam 311″. A vapor bubble 319 is formed in the dye solution 307 whenever scanned-focused-heat-beam 315‴ is switched on. When the bubble 319 exists, roughly the central portion of scanned-illumination-beam 311″ transmits through the modulator 301 as an image beam 311′ and scanned-focused-heat-beam 315‴ transmits as transmitted-heat-beam 315′. When a bubble 319 is not present, the scanned-illumination-beam 311″ is blocked and therefore the image beam 311′ is turned off. The liquid/vapor modulator 301 is constructed with two transparent plates. One plate will be called the illuminated plate 303 and the other plate will be called the image plate 305. The plates each have two main surfaces. In the illuminated plate 303, there is an illuminated-external-surface 303′ and an illuminated-internal-surface 303″. In the image plate 305, there is an image-external-surface 305′ and an image-internal-surface 305″. The illuminated-internal-surface 303″ faces the image-internal-surface 305′ and between these two surfaces is a dye solution 307. The two plates are held separate and the dye solution 307 is sealed between the two plates by a seal 309.

An experiment was run utilizing the general set-up in FIG. 3 in which the illumination source 313 was a Photochemical Research Associates (London, Canada) lamp housing Model AL 4215 and a 75 watt high pressure mercury arc lamp. The focused-illumination-beam 311 was focused using this lamp housing such that the scanned-illumination-beam 311″ was approximately one inch in diameter when it intersected the modulator. In the experiments run, a Corning 7-51 (Corning, N.Y.) filter was used to filter most of the light except for the UV light centered around 365 nm. This filter was placed in the illumination-beam to reduce the amount of excess light energy in the scanned-illumination-beam 311″ at the modulator 301 surface and to assist in focusing the UV portion of the energy. However, the filter is not required. The dichroic mirror 321 has the advantage when placed in the path of the illumination beam 311 in that, while it substantially transmits the Uv and visible portion of the illumination beam 311 radiation, it reflects the infra-red radiation that would be substantially absorbed by the SQS dye in the dye solution 307 of the modulator 301. Therefore the dichroic prevents the formation of large vapor bubbles 319 within that solution 307. The focused-heat-beam 315, which in this case emanated from a Liconix Diolite 800 laser 317 capable of 40 mW output at 830 nm, was substantially reflected off dichroic mirror 321 and became substantially collinear with focused-illumination-beam 311. Both beams were then reflected off two scanner mirrors 323, made by General Scanning Inc. (Watertown, Mass.), mounted in a XY3037Y XY scan head and driven by two DX2002 drivers. Vector image data was provided from a file generated by an HP computer.

The modulator 301 cell consisted of two 6″ by 6″ by 1/16″ thick quartz glass plates separated by about a 1 mil gap and sealed with a glass flux. The dye solution 307 consisted of approximately 10% Brookfield Viscosity Standard Fluid L-3, POPOP dye saturated in methylene chloride, and SQS and Cyasorb-24 dyes added to yield a final optical density through the modulator 301 of OD (optical density) >3.5 from approximately 200–400 nm, OD <0.8 from approximately 400–700 nm, and OD 4 from approximately 700–850 nm. Lines were drawn in Cromalin ® utilizing this set-up. There was a tendency for bubbles 319 to form and stay at the end of vectors even when the beams were no longer scanning that portion of the modulator 301. This is primarily because the General Scanning vector scanner does not compensate for the extra exposure that occurs at the beginning and end of vectors as the mirrors start and stop their rotation.

Depth of focus of the scanned-focused-heat-beam 315‴ is an important parameter. Typically the scanned-focused-heat-beam spot size at the dye solution intersection was on the order of 50–60 um. When a scan mirror is placed near the modulator, the radius of scan, or distance between the scan mirror and dye solution intersection, changes dramatically as different regions of the modulator are scanned. This also creates substantial changes in the scanned-focused-heat-beam spot size in the various regions of the modulator. An increase in spot size, means that more dye solution must be heated by the energy from the scanned-focused-heat-beam. Effectively, for optimum operation, the scanned-focused-heat-beam spot size should be less than 127 um (1/e 2 diameter) and preferably less than 60 um (1/e 2 diameter). Also, the scan radius should preferably not vary more than plus or minus one Rayleigh focal length when scanning the dye solution.

There are many ways to control the spot size of the scanned-focused-heat-beam when scanning a modulator. General Scanning supplies a linear translator that changes the beam focus as a function of scan radius. F/theta scan lenses may be utilized to correct the scanned-focused-heat-beam spot size as a function of scan angle. The entire modulator need not necessarily be a flat shape. In fact the liquid/vapor modulator may be any shape or size convenient to the user. For example, the modulator and the dye solution gap could be in substantially the shape of a portion of a sphere so that the scanned-focused-heat-beam is always focused on the dye solution. Or the illumination plate could be in the shape of a lens that refracts the scanned-focused-heat-beam as a function of scan radius and region being scanned on the modulator. Indeed, the modulator may be in the shape of a thermometer, where bubbles are created and condensed in the dye solution contained in a line in a linear cell.

A similar experiment was run utilizing a liquid/vapor modulator 301 of the same construction as above except that the dye solution 307 was comprised of a 75-25 mix by volume of methylene chloride and methanol respectively with SQS, Cyasorb-24, and POPOP dye to form a modulator 301 with optical density comparable that used in the first experiment described above. In this case, however, the illumination source 313 was a Coherent (Palo Alto, Calif.) Argon-Ion laser Model 306 operating in the UV with output ranging over wavelengths 333.6 nm to 363.8 nm. The spot size of the scanned-illumination-beam 311″ was approximately ⅛″ in diameter and the power at the modulator 301 was approximately 6 mW. The heat-beam laser 317 producing the focused-heat-beam 315 was a Sanyo (Sanyo, Japan) 100 mW diode laser operating at approximately 800 nm. A Melles Griot (Irvine, Calif.) Diode Laser Driver model 06 DLD 001 was used with a Melles Griot Diode universal cable connected to the heat-beam laser 317 in the "A" electrical configuration. The beams were scanned using a Greyhawk Systems (Milpitas, Calif.) "Squat-Plot" scanner with X-Y scan mirrors 323, connected to a Dell Systems computer that supplied HPGL vector data. The Greyhawk vector scanner system employs encoders on the axes 325 of their scan mirrors 323 to create electrical pulse signals, thereby indicating the amount of rotation of the axes 325 and therefore the distance moved by the beams reflected off the mirrors 323 in the image plane. These signals are processed digitally, taking into account presence of image space and amount of desired exposure, to create 5 V TTL pulses. These pulses were used to switch the Melles Griot Laser Driver and therefore modulate the heat-beam laser 317 as the substantially collinear beams scanned over the image plane. Effectively, the heat-beam laser 317 was modulated digitally corresponding to a discrete distance that the beam moved in the image plane. Since the modulation of the laser called for the laser to be on for a specific time frame per pulse, the result was a substantially more uniform exposure per distance moved by the scanned-focused-heat-beam 315‴ in the image plane. The image plane in this case is the dye solution 307. With the Greyhawk scanner and heat-beam laser 317 modulation capability, the time that the scanned-focused-heat-beam 315‴ spot spends making the bubble 319 is easily controlled, potentially giving some more control on the size of bubble 319 formed and amount of image beam 311′ energy that passes through the modulator 301 in any given region.

In the above experiment, a photoformable composition useful in Solid Imaging was exposed thereby forming photoformed layers. Samples were prepared using a photoformable formulation as detailed in DuPont's patent U.S. Pat. No. 5,002,854 issued Mar. 26, 1991 and entitled "Solid Imaging Method Using Compositions Containing Core-Shell Polymers", Example 2.

For example, a Solid Imaging system could be constructed wherein the modulator 301 image-external-surface 305′ is coated with a release coating such as Teflon AF ® (DuPont, Wilmington, Del.). Teflon AF ® coatings have been applied to quartz plates using the following procedure. Clean the glass surface to be coated. Spin coat a mixture of methylene chloride and 10% Elvacite ® 2044 (DuPont, Wilmington, Del.) at about 2500 rpm for about 1 second and allow to dry. Spincoat Teflon AF 8% FPX/FC-40 at 1000 rpm for about 1 second and oven heat at 180° C. approximately 15 minutes. Polymers other than the Elvacite ® may be used to provide a wettable bonding surface for the Teflon AF ®. Next, place the modulator 301 in a frame that forms a vat on the Teflon AF ® coated side of the modulator 301. In this Solid Imaging system construction, the modulator 301 is oriented with the Teflon AF ® coated side up and scanning of the substantially collinear scanned-illumination-beam 311″ and scanned-focused-heat-beam 315‴ is performed from below. Pour the photoformable composition in the vat frame on top of the modulator 301 and fabricate the three-dimensional object moving a platform and making layers in a manner similar to that taught by Kodama (Kokai Patent No. SHO 56(1981)-144478, Japan, later published on Nov. 10, 1981) and shown in FIG. 6 (of that publication) in conjunction with exposures given through the modulator 301 by a system as shown in FIG. 3 of this disclosure.

Other types of illumination systems could be utilized for such a Solid Imaging system. The illumination may be, for example, an area illumination as shown in FIG. 1, a region of illumination around the focused-heat-beam as shown in FIG. 3, a tightly focused illumination as shown in FIG. 2, or a linear region of illumination as is discussed later in FIG. 5. Many kinds of incoherent light illumination sources are well known in the art, for example mercury arc, high pressure sodium, xenon etc., each with a range of wavelength output and an intensity at each specific wavelength. Most illumination sources have wavelength outputs in many ranges throughout the UV, visible and IR. However, illumination lasers, such as for example a HeCd Uv laser with an output of approximately 325 nm, may have wavelength outputs of very nearly one specific wavelength.

Also, other types of photoformable composition coating methods could be employed. For example, the modulator could be placed out of contact with the composition, with the illumination and laser scanning performed on top, and knife coating methods could be utilized to provide the various layers necessary for production of the three-dimensional object. Or, for example, a film could be stretched under the modulator with the other side of the film in contact with the composition. Once the exposure is performed, the modulator could be translated away and the film could be peeled from the photoformed surface. Then the modulator could be translated back into position above the previously formed layer, with a new layer of photoformable composition formed between the film and the previous layer, and a new exposure could be performed.

Figure 4:
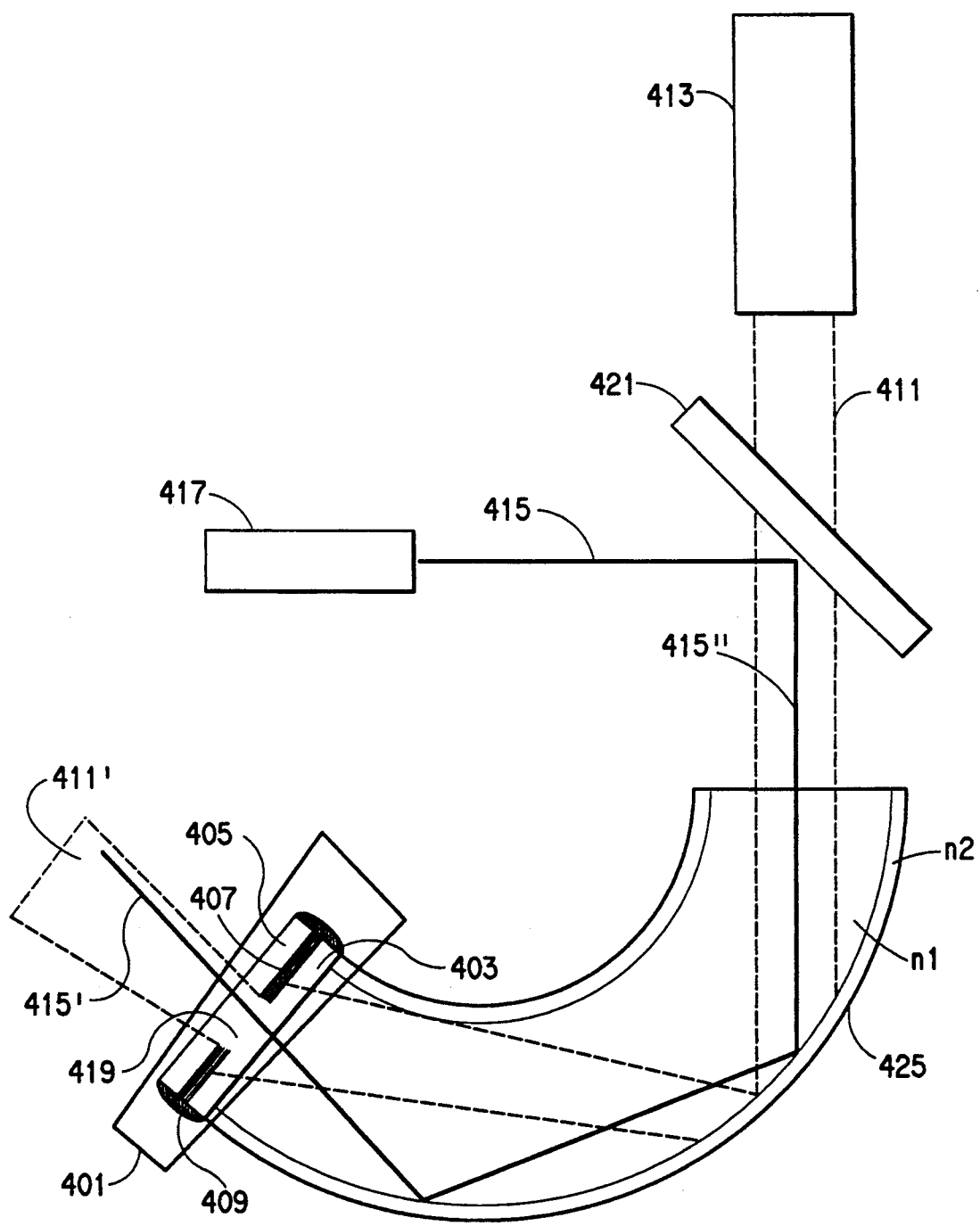
FIG. 4 shows a liquid/vapor modulator which is mounted on a fiber optic useful for modulating the image radiation from the fiber optic.

The liquid/vapor modulator could be large or small. For example, FIG. 4 shows a modulator 401 attached to the end of a fiber optic 425. Although FIG. 4 shows the modulator made with an illumination plate 403 and an image plate 405 held together and sealed by a seal 409, The modulator 401 could conceivably be constructed by encapsulation of the dye solution 407 in a transparent glass or polymer shell. In this case, the fiber optic 425 is such that the reflected-heat-beam 415″ enters the core n1 of the fiber optic 425 which core has a first refractive index. As the reflected-heat-beam 415″ passes through the core n1 it reflects off the cladding n2 which has a second refractive index. Guided in this way, eventually the reflected-heat-beam 415″ enters the modulator 401 and creates a bubble 419 in dye solution 407 and passes through the modulator as transmitted-heat-beam 415′. Heat-beam laser 417 radiates a heat-beam 415 which is reflected off a dichroic mirror 421 and which becomes reflected-heat-beam 415". Illumination source 413 radiates illumination radiation 411 which substantially transmits through dichroic 421 and enters into the core n1 of fiber optic 425 through which it is guided, reflecting off the cladding n2 until it illuminates modulator 401. When reflected-heat-beam 415" is not present and therefore when bubble 419 does not exist, illumination radiation 411 is substantially blocked by dye solution 407. However when reflected-heat-beam 415" is present and bubble 419 exists, illumination radiation 411 transmits through the modulator 401 as image radiation 411'. The dichroic mirror 421 is not necessary if both the illumination radiation 411 and the heat-beam 415 can be introduced into the fiber optic 425 through its acceptance angle.

Figure 5B:
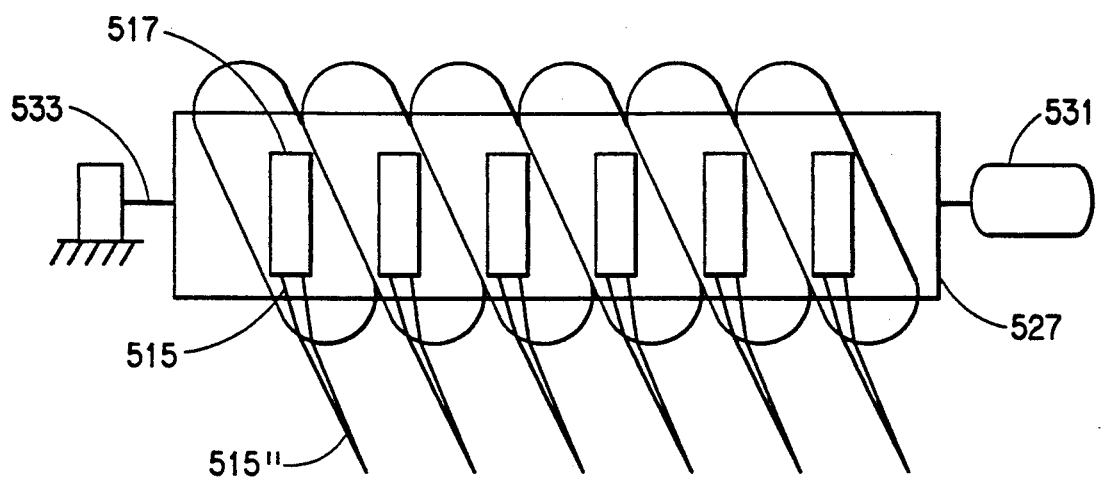
FIGS. 5a and 5b depict a more advanced version of FIG. 3 wherein multiple focused-heat-beams are scanned over the surface of the modulator creating multiple respective bubbles and thereby providing several regions for the illumination radiation to transmit through the cell as image radiation.
Figure 5A:
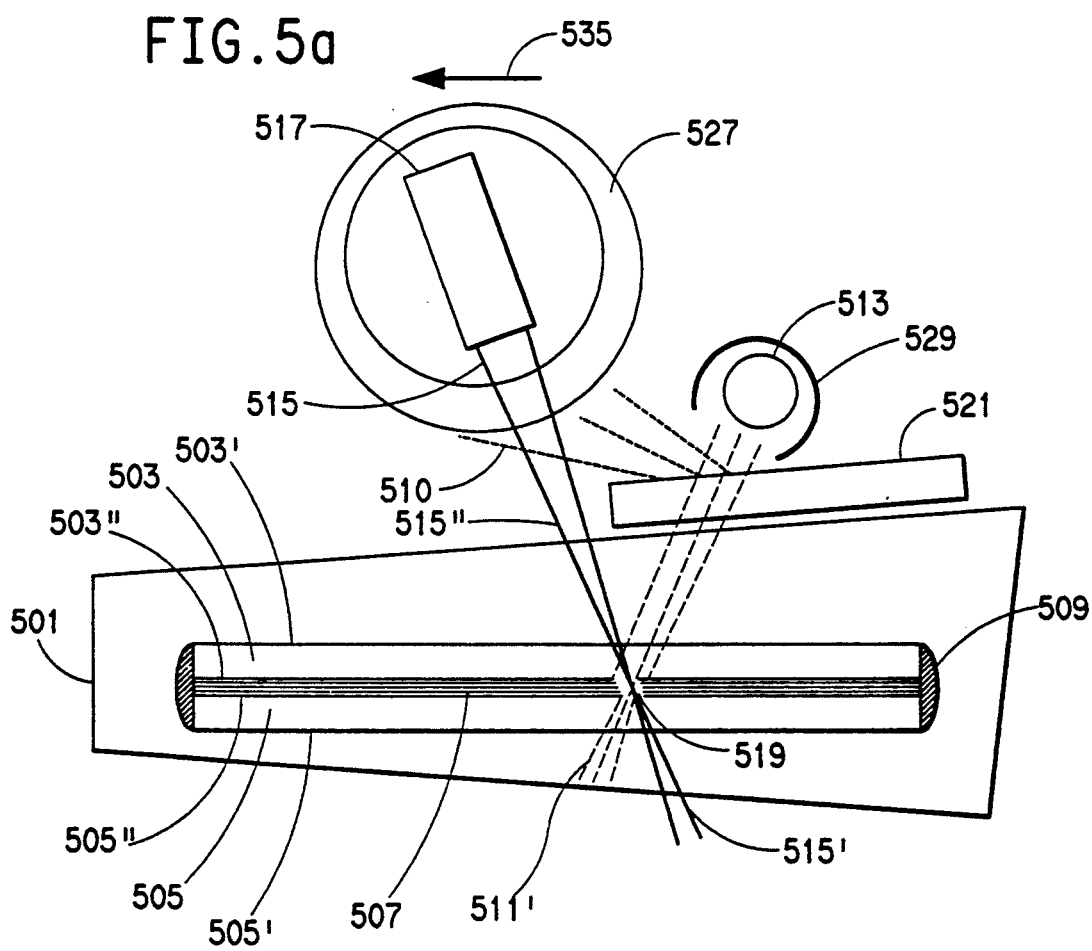

FIGS. 5a and 5b disclose a preferred embodiment of a liquid/vapor modulator 501 in which the components of the modulator 501 itself are equivalent to the components described in FIGS. 1-3. An illumination plate 503 and an image plate 505 face one another with illumination-internal-surface 503" and image-internal-surface 505" forming a gap which contains dye solution 507. The illumination plate 503 also has an illumination-external-surface 503'. And the image plate 505 has an image-external-surface 505'. Both plates are held apart, and the gap between them is sealed with a seal 509. In FIG. 5a, the illumination source 513 is a linear tube exposure lamp. For example the imaging source 513 could be a Fusion Systems Corporation (Rockville, Md.) F450 lamp system using a 10 D bulb capable of relatively high power UV radiation output. Between the illumination source 513 and the modulator 501 is a dichroic mirror 521 which is used, if necessary, to reflect away wavelengths of undesirable radiation 510. Around the illumination source 513 is a reflector 529 which reflects and somewhat linearly focuses the illumination radiation 511 onto the modulator 501. A series of lasers 517 is placed in a rotating scan lens 527 which is supported on an axis 533 and rotated by a motor-encoder 531. As the rotating scan lens 527 rotates, the focused-heat-beams 515 are scanned back and forth along a line parallel with axis 533 becoming scanned-focused-heat-beams 515". As an example, in FIG. 5a there are six lasers 517 shown each having a focused-heat-beam 515. Assume that each laser 517 is spaced one inch apart. Further assume that the rotating-scan-lens 527 is such that each focused-heat-beam 515 at the focal spot traverses back and forth a one inch distance, parallel to the axis 533 for each rotation of the rotating-scan-lens 527. In this configuration, with the exception of the two end heat-beam lasers 517, the beginning of one scanned-focused-heat-beam 515" focal spot travel would be the beginning of an adjacent scanned-focused-heat-beam 515" focal spot travel. In this way, any part of a six inch long line, parallel to axis 533 could be scanned by one of the heat-beam lasers 517. This minimizes heat-beam laser 517 costs while solving difficulties of obtaining a small focal spot size within the required depth of focus as described earlier. As indicated by an arrow, scan-head-translation-means 535 translates the scan-head-assembly (consisting of the illumination source 513, the reflector 529, the dichroic mirror 521, the rotating-scan-lens 527, the lasers 517, the axis 533, and motor 531) across and parallel relative to the surface of the modulator 501. Coupling the scan-head-translation-means 535 with rotation of the rotating-scan-lens 527 motor-encoder 531 and modulation of lasers 517 allows a focused spot of at least one scanned-focused-heat-beam 515" to potentially access any point within the dye solution 507 of the modulator 501. With this scan system, images could be created by essentially scanning out parallel banks of raster scans. At each region within dye solution 507 intersected with a scanned-heat-beam 515" a bubble 519 is formed allowing transmitted-heat-beam 515' to pass through the modulator 501. Portions of illumination radiation 511 which are normally blocked by dye solution 507 pass through the bubbles 519 as image radiation 511'. A reciprocating series of optical wedges could be substituted for the rotating-scan-lens 527 shown.

The modulator plate materials used in the practice of this invention were typically quartz glass plate. This was preferred for several reasons. The first reason is that quartz glass is optically clear and transparent for Uv operation. Another reason is that quartz glass withstands marked temperature differentials without cracking and therefore can be glass flux sealed, can be freeze degassed, and can withstand point sources of heat without breaking. A further reason is that the quartz glass has low permeability to the solvent and is chemically inert to the materials used in the dye solutions. Another reason is quartz plate's natural flatness.

Glue sealing of the plates provides a temporary modulator cell. However, glue sealing with, for example, epoxy is not preferred since there is a tendency for the epoxy to crack the quartz plate during curing and when the epoxy swells from solvent absorption. The modulator cell gap was usually created utilizing 1 mil thick shims. Another method of forming the cell gap while glass flux sealing the edges is to place crushed magnesium oxide, which has a melting point above that of quartz glass, between the two plates forming the gap. Then glass flux seal the plates around the edges. Usually the cell is placed in an oven to relieve stresses in the plates after sealing. An acid solution should dissolve the magnesium oxide and therefore prepare the cell for filling with dyes. The test cells had two ball and socket joints fluxed to them for filling and emptying the cells of the dye solutions.

The most preferred heat-beam laser for generating the focused-heat-beam as described above, is a single stripe diode laser operating at around 800 nm. These lasers are most preferred because of their efficiency, ease of modulation, compactness and relatively high power at tolerable cost. Such lasers operating at as low as 10 mW and as high as 100 mW have been demonstrated to be capable of creating a bubble, though lower or higher power lasers may be used. Other wavelength heat-beam diode lasers may also be used, however, most of the thermal dyes and the higher power diode lasers are in the 800 nm range. Other lasers, for example, a HeNe laser may prove suitable with the appropriate dyes and modulation means. The focused-heat-beam may be intensity modulated either digitally or in analog fashion. Analog intensity modulation of the focused-heat-beam may have advantages in control of the bubble size and may provide spatial modulation of the image radiation.

What is claimed is:

1. A method of modulating image radiation comprising the steps of:
    a) containing a dye solution in a cell, said dye solution comprising a solvent and at least one dye capable of absorbing radiation from a heat-beam and converting energy from said heat-beam to heat;

b) illuminating said cell and said dye solution with illumination radiation having a wavelength, said solution being adaptable to substantially block said wavelength of said radiation; and c) intersecting a region of said dye solution with said heat-beam, thereby forming a bubble within said region of said solution, allowing at least part of said illumination radiation of said wavelength to pass through said bubble and said cell, thereby modulating said image radiation.

2. A method of modulating image radiation as recited in claim 1 further comprising the steps of:

d) removing said heat-beam from said region of said dye solution; and e) allowing said bubble in said region of said solution to condense, thereby substantially blocking said illumination radiation of said wavelength and thereby modulating said image radiation off.

3. A method of modulating image radiation as recited in claim 1 or 2 wherein said illumination radiation originates from an incoherent light illumination source.

4. A method of modulating image radiation as recited in claim 1 or 2 wherein said heat-beam emanates from a diode laser.

5. A method of modulating image radiation as recited in claim 1 or 2 wherein said illumination radiation and said heat-beam are substantially collinear.

6. A method of modulating image radiation as recited in claim 1 or 2 wherein said dye solution substantially blocks said illumination radiation of said wavelength by photoluminescence mechanisms.

7. A method of modulating image radiation as recited in claim 2 wherein said illumination and said heat-beam enter said modulator via a fiber optic.

8. A method of modulating image radiation as recited in claim 3 wherein said illumination radiation has more than one wavelength and said dye solution substantially blocks at least one of said wavelengths.

9. A method of modulating image radiation as recited in claim 5 wherein said substantially collinear illumination radiation and heat-beam are reflected by at least one scan mirror.

10. A method of modulating image radiation as recited in claim 6 wherein said dye solution shifts said wavelength of said illumination radiation to longer wavelengths which said dye solution does not substantially block.

11. A method of modulating image radiation as recited in claim 8 wherein additional heat-beams are used and said heat-beams are scanned with a rotating-scan-lens, creating respective bubbles in different regions of said dye solution, and wherein said illumination source is linear.

12. An apparatus for modulating image radiation comprising:

a) a cell having a gap;

b) a dye solution contained with said cell said dye solution comprising a solvent and at least one dye capable of absorbing radiation from a heat-beam and converting energy from said heat-beam to heat;

c) an illumination source adaptable to illuminate said cell and said dye solution with illumination radiation having a wavelength, said dye solution being adaptable to block said illumination radiation of said wavelength; and d) a laser for generating said heat-beam, said heat-beam being adaptable to intercept a region of said dye solution and said heat-beam being adaptable to vaporize said region of said dye solution, thereby causing said region to stop blocking at least part of said illumination radiation of said wavelength, and thereby allowing at least part of said illumination radiation of said wavelength to pass from said cell as image radiation.

13. An apparatus for modulating image radiation as recited in claim 12 further comprising:

e) a dichroic mirror for making said heat-beam and said illumination radiation substantially collinear; and f) a scan mirror for scanning said substantially collinear heat-beam and illumination radiation.

14. An apparatus for modulating image radiation as recited in claim 12 further comprising:

e) an optical fiber for guiding said heat-beam and said illumination into said dye solution.

15. An apparatus for modulating image radiation as recited in claim 12 wherein said dye solution comprises a blocking dye (p-Bis{2-{5-Phenyloxazolyl}}benzene), methylene chloride, and a thermal dye having the structure:

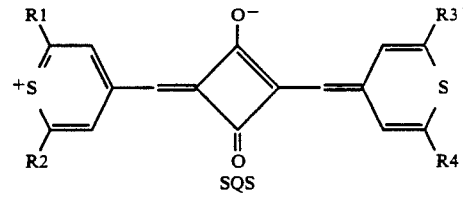

wherein each R1, R2, R3, and R4 is independently an alkyl group of from one to eight carbon atoms.

16. An apparatus for modulating image radiation as recited in claim 15 wherein R1, R2, R3 and R4 are each t-butyl.

17. An apparatus for modulating image radiation as recited in claim 12 further comprising:

e) at least one more laser emanating a heat-beam; and f) a rotating-scan-lens for scanning said heat-beams into different regions of said dye solution.

* * * * *